(12) United States Patent
Petersson et al.

(10) Patent No.: US 8,750,253 B2
(45) Date of Patent: Jun. 10, 2014

(54) SYSTEM FOR WIRELESS COMMUNICATION AND A METHOD FOR PROVIDING WIRELESS COMMUNICATION

(75) Inventors: Sven Oscar Petersson, Savedalen (SE); Bo Hagerman, Tyreso (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 534 days.

(21) Appl. No.: 13/139,817

(22) PCT Filed: Dec. 18, 2008

(86) PCT No.: PCT/SE2008/000727
§ 371 (c)(1),
(2), (4) Date: Jun. 15, 2011

(87) PCT Pub. No.: WO2010/071492
PCT Pub. Date: Jun. 24, 2010

(65) Prior Publication Data
US 2011/0249588 A1      Oct. 13, 2011

(51) Int. Cl.
*H04Q 7/00*      (2006.01)
*H04B 1/56*      (2006.01)
*H04B 17/00*     (2006.01)

(52) U.S. Cl.
CPC ............... *H04B 1/56* (2013.01); *H04B 17/003* (2013.01)
USPC ............ 370/334; 370/252; 370/339; 455/561

(58) Field of Classification Search
USPC .......................................... 370/252, 334, 339
See application file for complete search history.

(56) References Cited

U.S. PATENT DOCUMENTS

| | | | |
|---|---|---|---|
| 2003/0048760 A1 | 3/2003 | Park et al. | |
| 2005/0136980 A1* | 6/2005 | Kim et al. | 455/562.1 |
| 2010/0224725 A1* | 9/2010 | Perlman et al. | 244/1 R |
| 2010/0316156 A1* | 12/2010 | Higuchi et al. | 375/267 |

FOREIGN PATENT DOCUMENTS

| | | |
|---|---|---|
| CN | 1838559 A | 9/2006 |
| CN | 101047399 A | 10/2007 |

OTHER PUBLICATIONS

LG Electronics, "MIMO Related L1/L2 Control Channel—Dedicated PMI Signaling" 3GPP Draft; R1-071557, Apr. 3, 2007, 3 pages, XP050105488.
Search Report issued in corresponding Chinese application No. 200880132471.0 on May 26, 2013, 2 pages.

* cited by examiner

*Primary Examiner* — Wanda Z Russell
(74) *Attorney, Agent, or Firm* — Rothwell, Figg, Ernst & Manbeck, P.C.

(57) ABSTRACT

The present invention relates to a system for wireless communication comprising a first transceiver circuitry (BS) connected to a plurality of virtual antenna ports of an antenna arrangement; each virtual antenna port is a combination of one or more physical antenna ports. The first transceiver circuitry (BS) is configured to: communicate with a second transceiver circuitry (UE) via the antenna ports of the antenna arrangement; receive primary beamshaping information related to a first link (Downlink) between the first transceiver circuitry (BS) and the second transceiver circuitry (UE); determine secondary beamshaping information related to a second link (Uplink) between the second transceiver circuitry (UE) and the first transceiver circuitry (BS); and apply at least one weight vector based on the primary and secondary beamshaping information for subsequent transmission of signals from the first transceiver circuitry (BS) via the plurality of virtual antenna ports of the antenna arrangement.

14 Claims, 3 Drawing Sheets

SYSTEM FOR WIRELESS COMMUNICATION AND A METHOD FOR PROVIDING WIRELESS COMMUNICATION

CROSS-REFERENCE TO RELATED APPLICATION

This application is a 35 U.S.C. §371 National Phase Entry Application from PCT/SE2008/000727, filed Dec. 18, 2008, and designating the United States.

TECHNICAL FIELD

The present invention relates to a system for transmitting signals between a first transceiver and a second transceiver, wherein beamshaping information related to uplink and downlink is used to determine weight vectors applied for subsequent transmissions of signals.

BACKGROUND

Beam forming has been studied in cellular applications for many years but has not been widely adopted in commercial systems so far. Now the situation appears to change and one example where beam forming is beginning to be commercially used is in TD-SCDMA in China. Further, LTE standardization seems to rely on beam forming as one basic component.

It is common to distinguish between two types of beam forming; a closed loop beam forming that is based on information obtained by the receiving part being fed back to the transmitting part, and a non-closed loop beam forming that is based on information determined from a signal received without a priori knowledge of the transmitting part.

In the closed loop beam forming, measurements are performed at the intended receiver of the transmission link targeting "optimization", and the measurements/metrics are fed back to the transmitter via a return transmission channel. The feedback measurements/metrics are planned to be used in the subsequent transmissions to "optimize" the transmission of a signal to the intended receiver that performed the measurements. The procedure implies an a priori defined sequence or protocol suite to be utilized. A detailed description of closed loop beam forming is presented in connection with FIG. 1a.

Examples are closed loop TX diversity in WCDMA and codebook based precoding in LTE, reference [1] chapter "6.4 Precoding" for up to 4 layers.

In the non-closed loop beam forming, measurements are performed on a received signal without a priori knowledge of the transmitting part, and the measurements/metrics are used for "optimizing" the transmission on a return channel, i.e. transmission from the measuring node to the previous transmitting party as receiver. This implies that measurements may be performed by the measuring node on any signal generated by the intended receiver to "optimize" transmission on the return channel even if the measurements are performed on a signal intended for any other node. A detailed description of non-closed loop beam forming is presented in connection with FIG. 1b.

A foundation for non-closed loop beam forming in LTE is given by the introduction of UE-specific reference signals as described in reference [1], chapter 6.10.3.

The published international application WO 01/69814 A1, reference [3], assigned to Nokia Networks OY, discloses a system that uses a closed loop a priori defined protocol suite according to the definition above for the used measurements. Specifically it is described according to the prior art methods defined in the 3GPP WCDMA standard for closed-loop Tx-diversity utilizing the available pilot signal structures. Described is also that this closed loop modes in a similar fashion may be extended to multiple-antennas beyond the two antenna method defined in 3GPP. Further, this closed-loop mode feedback is however the only measurements utilized in their "optimization" of the transmission channel, no additional measurements are utilized in that process.

A drawback with channel estimation in the prior art is that the channel estimation will be challenging at low levels of received SNR/SNIR, and further as a consequence creating less accurate momentarily preferred Tx-diversity/pre-coding antenna weight vectors jeopardizing the performance of multi-antenna modes.

SUMMARY OF THE INVENTION

An object with the present invention is to provide a system for wireless communication with an improved transmission quality between two nodes in a communication network compared to prior art devices.

This object is achieved by a system including a first transceiver circuitry, such as a base station (BS), with a plurality of antenna ports, and a second transceiver circuitry, such as a user terminal (UE) with an arbitrary number of antenna ports. The BS communicates with the UE by transmitting signals via the antenna ports, and primary beamshaping information based on the received signals in a first link, i.e. downlink (DL), is obtained in the UE and is transferred to the BS. The UE communicates with the BS by transmitting signals, and secondary beamshaping information based on the received signals in a second link, i.e. uplink (UL) is determined in the BS. The BS uses the primary and the secondary beamshaping information to select and to apply one or more weight vectors for subsequent transmissions of signals to the UE from the BS.

An advantage with the present invention is that system performance is improved since the basis for weight vector selection is increased compared to prior art systems.

Another advantage is that the performance stability in the communication system is improved.

Still another advantage is that the performance at low levels of received SNR/SNIR is improved, especially for cell edge performance.

Further objects and advantages may be found by a skilled person in the art from the detailed description.

BRIEF DESCRIPTION OF DRAWINGS

The invention will be described in connection with the following drawings that are provided as non-limited examples, in which.

DETAILED DESCRIPTION

In the following a narrow beam, pointing in a desired direction, will be generated if the transmission is performed over "correlated antennas". Generating a narrow beam is typical for the traditional view of beam forming. However, these examples are not limited to be used in conjunction with "correlated" antennas but may also be used for "uncorrelated" antennas or a combination of both correlated and uncorrelated antennas. The latter is applicable for LTE where up to four antenna ports are supported in the standard. For the case of two uncorrelated antennas, by means of a dual polarized antenna, the goal is to generate a desired polarization for the transmitted signal rather than to generate a narrow beam. In this description, the term "beamshaping" is used as a more general type of beam forming than the traditional (narrow beam) view, and in this disclosure beamshaping includes generating a desired polarization, shape of beam and/or direction of beam.

Using the terms "correlated" and "uncorrelated" antennas is a common way of describing the correlation between different radio paths. For example between a single antenna at the UE and multiple antennas at the BS.

Figure 1A:
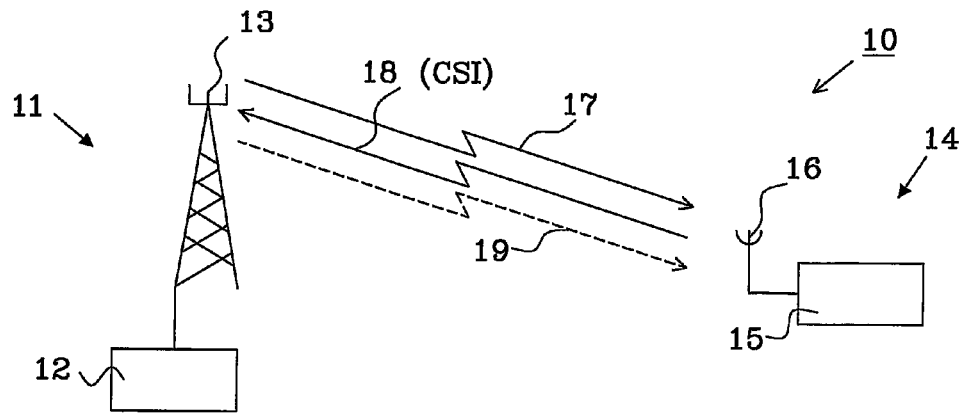
FIG. 1a shows a prior art communication system using closed loop beam forming.

FIG. 1a shows a prior art communication system 10 using closed loop beam forming, in which channel estimation is performed. For channel estimation purposes it is required that pilot/reference symbols, used for channel estimation, and the data passes the same channel. To be more precise, the requirement is that the pilots/reference symbols and the data are affected in the same way. The channel comprises not only the radio channel, between antennas, but also radio chains if these are not common for both types of information. Dedicated pilots, which are transmitted via the same beam as the data, are commonly used to secure that the signals passes the same channel. However, other methods based on common pilots also exist. See for example reference [2].

The communication system 10 comprises in this example a base station (BS) 11, with a first transceiver circuitry 12 connected to a plurality of antenna ports of an antenna arrangement 13, and at least one user equipment (UE) 14, with a second transceiver circuitry 15 connected to an antenna 16. The antenna ports may be considered to be virtual antenna ports wherein each virtual antenna port is a combination of one or more physical antenna ports. The first transceiver circuitry 12 is configured to communicate with the second transceiver circuitry 15 via the antenna ports of the antenna arrangement 13 and the UE antenna 16 by transmitting a pilot/reference signal 17.

The second transceiver circuitry 15 is configured to receive the pilot/reference signal 17 and estimate the channel to obtain channel state information (CSI) related to a link, i.e. downlink (DL) in this example. Beamshaping information related to DL, e.g. in the form of CSI, is transferred from the UE to the BS through any suitable, preferably wireless, communication channel 18, and the first transceiver circuitry 12 receives the beamshaping information related to DL between the first transceiver circuitry 12 and the second transceiver circuitry 15.

A weight vector based on the received CSI is applied to subsequent transmissions of signals 19, as marked with dashed lines, from the first transceiver circuitry 12 over the same radio chains as the pilot/reference signal 17 was transmitted earlier.

There are several reasons for applying beam forming on DL transmission. One is to exploit the angular spread of the channel, enabling multiple stream transmission. Another is to improve SNR such that capacity may be increased by means of for example higher order modulation.

However, when radio links become weak, the channel estimations in the UE becomes less accurate and, as a consequence, also the estimation and selection of e.g. the preferred precoding matrix (codebook index) in LTE will be less accurate/optimal.

Figure 1B:
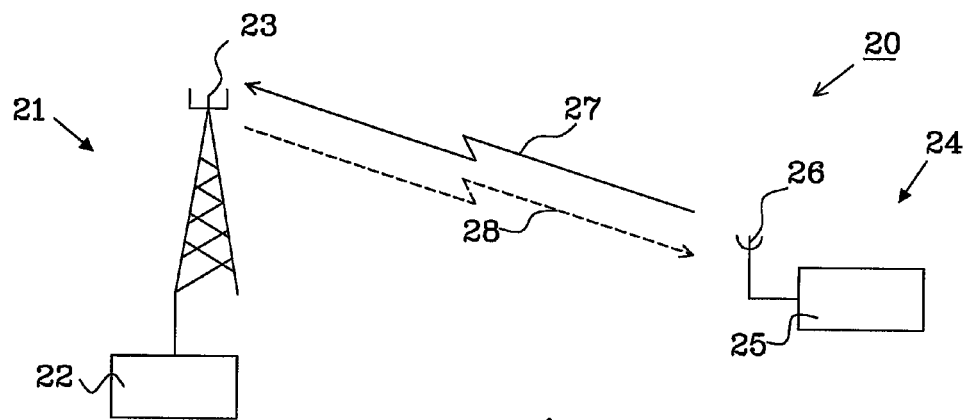
FIG. 1b shows a prior art communication system using non-closed loop beam forming.

FIG. 1b shows a prior art communication system 20 using non-closed loop beam forming. The measurement is performed by a receiving unit, such as User Equipment (UE) on downlink (DL) transmission or Base Station (BS) on uplink (UL) transmission. Depending on the type of system, FDD or TDD, system coherency, system architecture etc, different types of information may be derived. One commonly used information, at least for FDD systems, is direction on arrival (DOA). The basic idea is that one should transmit in the same direction, or the best of multiple directions, as signals were received. In more sophisticated concepts other information, such as directions in which energy shall not be transmitted to reduce interference to other users, may be used in the design of the transmission weight vector.

In this example, the communication system 20 comprises a BS 21 with a first transceiver circuitry 22 connected to a plurality of antenna ports of an antenna arrangement 23, and at least one user equipment (UE) 24, with a second transceiver circuitry 25 connected to an antenna 26. The antenna ports may be considered to be virtual antenna ports wherein each virtual antenna port is a combination of one or more physical antenna ports. The first transceiver circuitry 22 is configured to receiving any signal 27 via the antenna ports of the antenna arrangement 23 that originates from the second transceiver circuitry 25.

The first transceiver circuitry 22 is further configured to determine beamshaping information related to a link, in this example uplink (UL), and thereafter a weight vector based on the determined beamshaping information is applied to subsequent transmissions of signals 28, as marked with dashed lines, from the first transceiver circuitry 22 via the antenna arrangement 23 to the second transceiver circuitry 25.

Beamshaping information can be measured Direction on Arrival (DoA), estimated Direction on Departure (DoD) and/or polarization state.

Beamshaping can, in principle, be performed both in base station as well as in the user equipment. In the description herein we only consider the case where the beam forming is performed in the base station, i.e. for downlink transmission, but the methods can in principle be performed in the user equipment as well.

Figure 2:
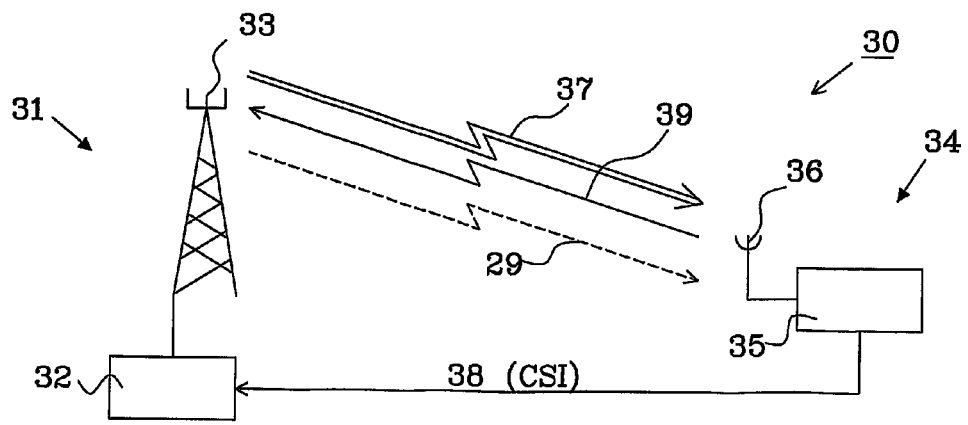
FIG. 2 shows a communication system according to the present invention.

FIG. 2 shows a communication system 30 according to the invention, in which beamshaping information received on DL and UL are combined in a favorable fashion, specifically targeting improved performance stability and improved performance at low levels of received SNR/SNIR (e.g. cell edge performance). The communication system 30 comprises a BS 31, with a first transceiver circuitry 32 connected to a plurality of antenna ports of an antenna arrangement 33, and at least one UE 34, with a second transceiver circuitry 35 connected to an antenna 36. The antenna ports may be considered to be virtual antenna ports wherein each virtual antenna port is a combination of one or more physical antenna ports.

The first transceiver circuitry 32 is configured to communicate with the second transceiver circuitry 35 via the antenna ports of the antenna arrangement 33 and the UE antenna 36 by transmitting a signal 37, preferably a pilot/reference signal, illustrated by double lines. The second transceiver circuitry 35 is configured to receive the signal 37 and estimate the channel to obtain channel state information (CSI) related to a first link, i.e. DL in this example. Primary beamshaping information related to DL is transferred from the UE to the BS through any suitable, preferably wireless, communication channel 38.

Primary beamshaping information may include channel estimates, such as channel state information (CSI), desired precoding matrixes and/or other types of quality indicators. This type of measurements was specified in WCDMA closed loop diversity modes 1 and 2 and is also specified in LTE for code book based precoding for spatial multiplexing transmission modes. The first transceiver circuitry 32 receives the primary beamshaping information related to DL between the first transceiver circuitry 32 and the second transceiver circuitry 35.

The first transceiver circuitry 32 is further configured to receiving any signal 39, continuous line, via the antenna ports of the antenna arrangement 33 that originates from the second transceiver circuitry 35. It should be noted that the transfer of the primary beamshaping information related to DL, if a wireless communication channel 38 is used, may be used as the signal 39. The first transceiver circuitry 32 determines secondary beamshaping information related to a second link, UL in this example, based on the received signal 39, in addition to the primary beamshaping information received from the second transceiver circuitry 35.

It should be emphasized that measurements to determine the secondary beamshaping information may be based on any type of data including user payload data, i.e. all dedicated data from a specific UE. This type of measurements is for example used in TD-SCDMA.

A weight vector based on the primary and secondary beamshaping information is applied to subsequent transmissions of signals 29, as marked with dashed lines, from the first transceiver circuitry 32 via the antenna arrangement 33 to the second transceiver circuitry 35.

The type of information that can be achieved on measurements on the UL transmission, to be used for the DL transmission depends on system characteristics.

For example in a FDD system, e.g. W-CDMA, the UL and DL are transmitted on separate frequency bands and there is no reciprocity between UL and DL due to the difference in carrier frequency. Thus there is less or no use for estimated radio channels. Instead typically, estimates on second order statistics are performed, such as determining the direction the signals arrive, direction on arrival (DOA) at the antenna. This information is for example the basis for generation of DL weight vector.

For a TDD system, e.g. TD-CDMA, it is possible to rely on reciprocity, since UL and DL use different time slots at the same carrier frequency, and if coherence requirements are fulfilled, an instant channel response can be estimated.

In the description in combination with FIGS. 1*a*, 1*b* and 2, the antenna arrangement for the transmitting node, i.e. the base station, has a plurality of virtual antenna ports in order to be able to control polarization, beam shape and direction. Each virtual antenna port may be connected to a single physical antenna port, but is normally a combination of several physical antenna ports.

It is preferred that a unique reference signal is transmitted via each virtual antenna port to be able to distinguish antenna elements connected to each virtual antenna port. If the same reference signal is transmitted via all antenna elements (i.e. via all virtual and physical antenna ports) this is not possible.

Figure 3:
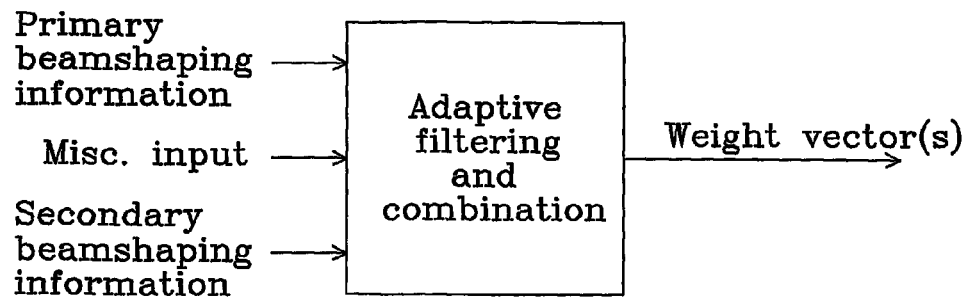
FIG. 3 shows a block diagram of a weight vector selection arrangement in a node according to the present invention.

FIG. 3 shows a block diagram of a weight vector selection arrangement implemented in the node together with the first transceiver circuitry, in which weight vector(s) to be used for transmission are generated based on adaptive filtering and combination of beam forming information derived on DL and UL. The weight vector(s) which is used to distribute the signal(s) to be transmitted over multiple antennas is based on beamshaping information derived not only from UL or DL but on a combination thereof. The combination shall be performed in such a fashion that desired properties are met as good as possible. The process involves filtering of each individual input, an adaptive combination of filtered inputs and filtering of combined information. Further, miscellaneous information such as UE speed etc. may also be used for optimizing performance.

The weight vector may be calculated, or be selected from predetermined precoding vectors available in a code book.

EXAMPLES

A) Less Accurate Closed Loop Feedback

A first example concerns detection when less accurate closed loop feedback information is received. This is preferably performed with threshold settings of either preset or adaptive levels on for example received SNR/SNIR and/or some accuracy estimation of the closed loop feedback information, e.g. Tx-diversity and/or pre-coder antenna weight vectors. Depending on the antenna configuration different methods for accuracy estimation may be applied. For correlated antennas the codebook index in LTE can be interpreted as a propagation direction. Thus, by applying a mapping between codebook index and DOA/DOD one may monitor the variations in desired DOD and based on this draw conclusions on accuracy.

B) Selecting Closed Loop Parameters for Transmission Based on Received Filtered Closed Loop Feedback Information A second example concerns filtering the received closed loop feedback information and selecting the filtered output closed loop mode parameters for transmission. An example of such filter functionality is a sliding average window over the received feedback information.

By applying a filter to the information reported by the UE one may derive "second order statistics" which the subsequent DL transmission may be based upon. For example, if the antenna array is a uniform linear array (ULA) and system coherency is sufficient, it is possible to interpret the codebook index as a desired DOD. This will of course disregard the fast fading but it will indicate the direction in which energy, on average, is best transferred to the UE. This transmission scheme may be regarded as a non-closed loop scheme even though it is based on "closed loop" information obtained from DL transmission. Now, since the scheme is in principle "non-closed loop" we may support the weight vector selection process by information received from UL as well.

In this example common reference signals may be used to obtain the beamshaping information (feedback information) transferred from UE to the BS for subsequent transmissions.

C) Selecting Closed Loop Parameters for Transmission Based on Combined Closed Loop and Non-Closed Loop Information A third example concerns filtering the received closed loop feedback information, performing non-closed loop signal measurements on the return channels and combining both types of information for selecting the output closed loop mode parameters for transmission. An example of such additional non-closed loop measured information is a DOA set of the strongest/best multiple directions/rays.

In this example common reference signals may be used to obtain the beamshaping information (feedback information) transferred from UE to the BS for subsequent transmissions.

D) Selecting Non-Closed Loop Parameters for Transmission Based on Combined Closed Loop and Non-Closed Loop Information A fourth example concerns filtering the received closed loop feedback information, performing non-closed loop signal measurements on the return channels and combining both types of information for selecting the output non-closed loop mode parameters for transmission.

In this example dedicated reference signals may be used to obtain the primary beamshaping information (feedback information) transferred from UE to the BS and to obtain the secondary beamshaping information by non-closed loop signal measurements on the return channels for subsequent transmissions.

Figure 4:
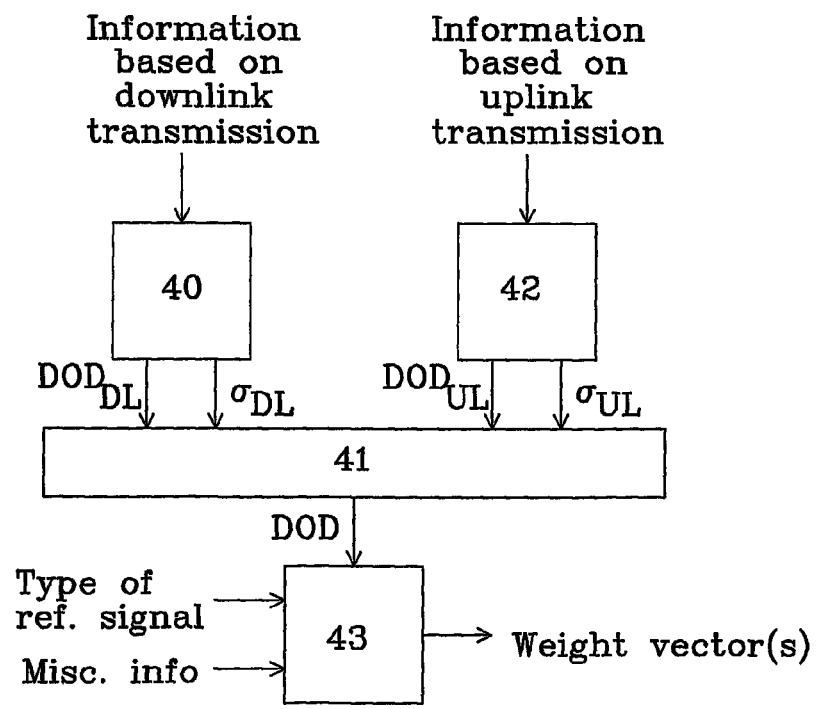
FIG. 4 is a flowchart illustrating the present invention.

FIG. 4 is a block diagram illustrating the process to apply a suitable weight vector on subsequently transmitted signals from a node, such as a base station.

Signals are transmitted from a transmitting node, e.g. a BS, and primary beamshaping information, based on downlink transmission, obtained by a receiving node, e.g. a UE, is transferred to the BS and inputted to a feedback estimator 40. The feedback estimator is configured to estimate DOD of the signals from the primary beamshaping information, e.g. desired precoding UE matrixes, to obtain a downlink value $DOD_{DL}$ and also to estimate variance $\sigma_{DL}^2$ of the downlink value $DOD_{DL}$. The downlink value and its variance are provided to an adaptive filter 41.

The primary beamshaping information may for example be desired (from the UE measured and reported) precoding matrix index (PMI). This PMI can be interpreted as a beam pattern. For a system with some common antenna configurations used for UL and DL, coherency is required if measurements on UL are to be used for DL transmission. Thus, for a coherent system the DOD and corresponding accuracy estimate may be excerpt from this beam pattern.

Secondary beamshaping information, based on uplink transmission, determined by the node intended to transmit the subsequent transmission, i.e. BS in this example, is inputted to a non-feedback estimator 42. The non-feedback estimator is configured to estimate DOD of the received signals from the secondary beamshaping information, e.g. measurements on uplink, to obtain an uplink value $DOD_{UL}$ and also to estimate variance $\sigma_{UL}^2$ of the uplink value $DOD_{UL}$. The uplink value and its variance are provided to the adaptive filter 41.

The secondary beamshaping information may be array response vectors used to generate a spatial spectrum from which the direction of arrival (DOA) is estimated. This angle is then converted to DOD which may be the same as the DOA but could be different based on for example knowledge about location of other users for handling interference spread. The estimated DOD should also be assigned some figure of merit to be used in the adaptive filter 41.

The adaptive filter 41 combines the inputs based on accuracy estimates and outputs a combined DOD to a weight vector generator 43. The weight vector generator 43 also receives a signal indicative of the type of reference signal used (dedicated or common), and possibly other miscellaneous information such as UE speed, other UEs in the cell, interference situation, etc. A dedicated reference signal is defined as a reference signal for a specific UE, and a common reference signal is defined as a reference signal for all UE in the cell.

In a system when dedicated reference signals have been used, the combined DOD, and possibly other miscellaneous information like interference situation etc. may be used for the weight vector generation. If instead common reference signals are used, the selection of precoding matrix is based on the combined DOD.

The generation of the variances in DOD for DL and UL is not described in detail, since this is standard procedures for a skilled person in the art, but in general a time series of measurements can be used, e.g. it is possible to use how fast/frequent the desired PMI changes as input for a variance estimation.

The adaptive filtering process is described in the following. When conditions are very good, i.e. high SNR giving accurate channel estimates in the UE, the adaptive filter ignores data from non-closed loop measurements; while when conditions are the opposite, the combined DOD is actually based in the measurements from the non-closed loop, i.e. secondary beamshaping information.

Information from measurements in the node intended to receive the subsequent transmission, e.g. the UE, can for example be quantized information in terms of PMI. This information can, via a model of the antenna, be interpreted as a quantized DOD. Average value and variance may be estimated over a moving time window, or a filter with "forgetting factor". The average value is denoted $\bar{\phi}_1$ and the variance $\sigma_1^2$.

Similarly, DOA may be estimated on UL and filtered to give an average value $\bar{\phi}_2$ and variance $\sigma_2^2$. The DOA will be transformed to a DOD, a transformation that typically is trivial by letting the DOD be identical to the DOA.

An estimate of a DOD at time k, based on both $\bar{\phi}_1$ and $\bar{\phi}_2$ can be expressed as:

$$DOD(k)=a\cdot\bar{\phi}_1(k)+(1-a)\cdot\bar{\phi}_2(k), \qquad (1)$$

Similarly, the variance may be expressed as:

$$\sigma_{DOD}^2(k)=a^2\cdot\sigma_1^2(k)+(1-a)^2\cdot\sigma_2^2(k), \qquad (2)$$

Minimizing the variance gives $$a = \frac{\sigma_2^2}{\sigma_1^2 + \sigma_2^2}, \qquad (3)$$

and thus $$DOD(k) = \frac{1}{\sigma_1^2 + \sigma_2^2}(\sigma_2^2 \cdot \bar{\phi}_1(k) + \sigma_1^2 \cdot \bar{\phi}_2(k)) \qquad (4)$$

Typically, this estimate will be transformed back to a quantized DOD which is known to the UE, for example by selecting the precoding index that is closest to the estimated value.

If a node, e.g. BS, is communication with a plurality of nodes, e.g. UEs, it is necessary for the BS to apply at least one weight vector for at least one user set of subsequent transmissions of signals, i.e. data payload to the each user, and at least one dedicated reference signal with the same applied weight vector(s) as the associated dedicated user transmission.

If the beam containing user payload data is controlled using a weight vector, then an associated dedicated reference signal should be transmitted using the same weight vector. Also, several user sets of payload data may be transmitted with a dedicated reference signal that is transmitted with the same weight vector. Such a user set may either comprise one or more payload transmissions associated with the same UE or to different UEs, and wherein each payload data transmission has its own weight vector.

For example, a transmission may contain four simultaneous data streams, wherein each of the data streams has an appointed dedicated reference signal, and each pair of data stream and dedicated reference signal has been appointed a weight vector, i.e. an individual beam. These four data streams may be arranged to transfer payload data to three UEs, wherein two UEs has one appointed data stream each and one UE has two appointed data streams with different weight vectors.

It is naturally possible to imaging a scenario wherein all data streams are appointed to one and the same UE, or wherein each data stream is appointed to a separate UE.

Figure 5:
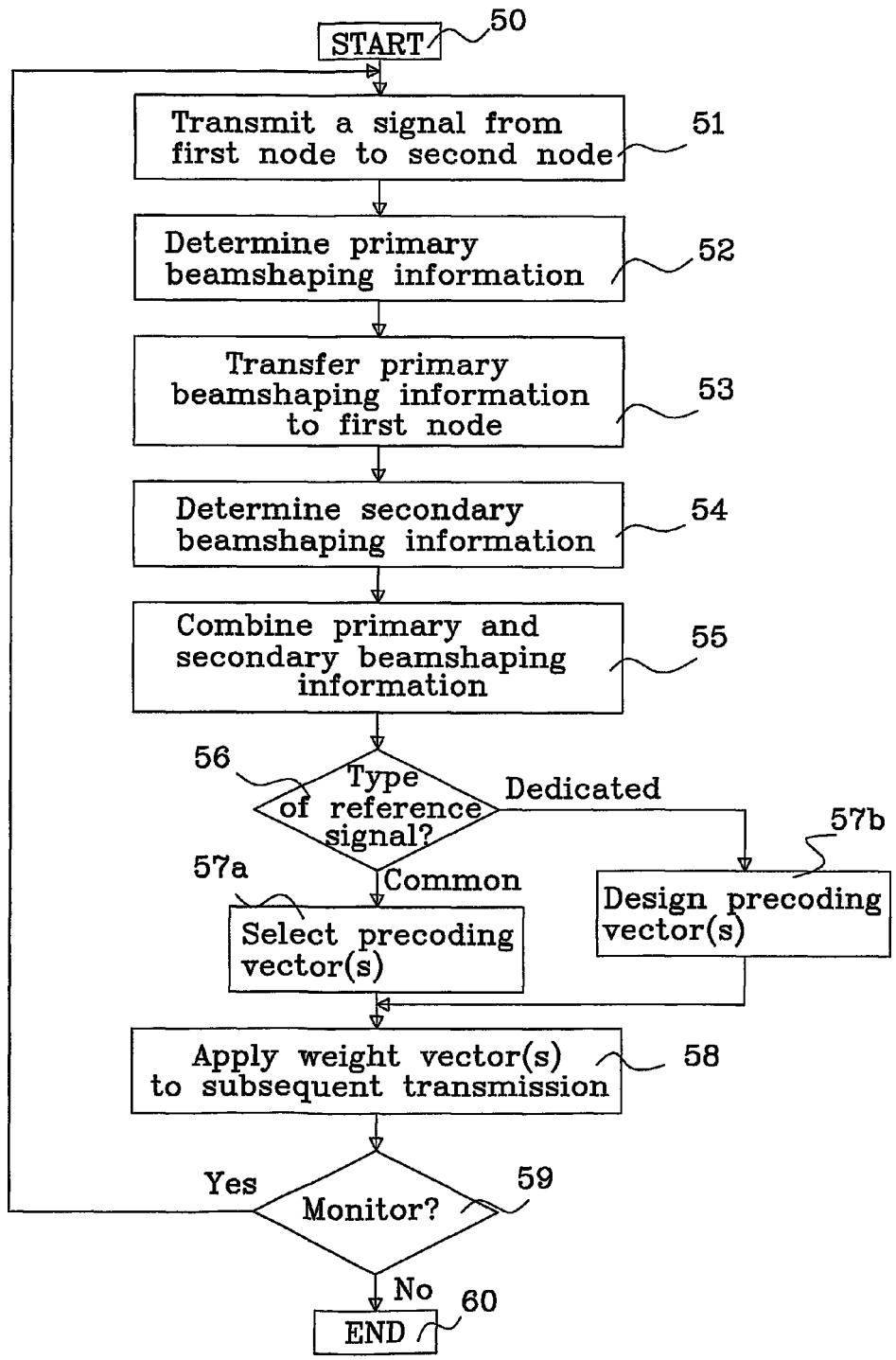
FIG. 5 is a flowchart of the process for selecting weight vectors according to the invention.

FIG. 5 is a flowchart that illustrates the process of selecting weight vectors based on primary and secondary beamshaping information.

The flow starts, step 50, and proceeds to step 51 in which communication is established between a first node and a second node by transmitting a signal, preferably a common, or dedicated, reference signal, from the first node including a first transceiver to the second node including a second transceiver. The transmitted signal is received by the second transceiver and primary beamshaping information is determined, as described above, in step 52.

The primary beamshaping information is transferred, preferably wireless, to the first transceiver circuitry in the first node, step 53. Secondary beamshaping information, based on any signal transmitted from the second transceiver circuitry and received by the first transceiver circuitry, is determined in the first transceiver, step 54, as described above.

The primary and secondary beamshaping information is filtered and combined in step 55, as described in connection with FIG. 4. The process is different dependent on whether subsequent transmission will be based on common reference signals or a dedicated reference signal, as determined in step 56. If the transmission will be based on using common reference signals, the flow continues to step 57a, where precoding weight vector(s) is/are selected from a number of predetermined precoding weight vectors. On the other hand, if subsequent transmission will be based on dedicated signals, the weight vector(s) is/are designed in a suitable way in step 57b. Further, miscellaneous information, such as signal direction of other transceiver circuitry and/or movement of the second transceiver circuitry may affect the design of the weight vector or selection of precoding weight vector from the code book.

The flow from step 57a and 57b merge in step 58, in which the weight vector(s) is/are applied to subsequent transmissions from the first node. If the quality of the established communication channel should be monitored, the flow is fed back to step 51 through step 59, or if the process should not be monitored any more, the flow continues to step 60, where the flow ends.

| Abbreviations | |
|---|---|
| BS | Base Station |
| DL | Downlink |
| DOA | Direction on arrival |
| DOD | Direction of departure |
| FDD | Frequency Division Duplex |
| PMI | Precoding matrix index |
| SNR | Signal to Noise Ratio |

| Abbreviations | |
|---|---|
| SNIR | Signal to Noise plus Interference Ratio |
| TDD | Time Division Duplex |
| UE | User Equipment |
| UL | Uplink |
| ULA | Uniform Linear Array |

REFERENCES

[1] 3GPP TS 36.211 V8.2.0 Physical Channels and Modulation

[2] US 20050101352, Multi-beam adaptive antenna system for use in cellular communication system, includes antenna array with multiple antennas which transmit wide beam and narrow beam covering sector cell.

[3] WO 01/69814 A1, assigned to Nokia Networks OY.

The invention claimed is:

1. An apparatus for wireless communication, comprising:
   antenna arrangement comprising a set of virtual antenna ports, each virtual antenna port being a combination of one or more physical antenna ports of the antenna arrangement; and
   a first transceiver circuitry connected to the plurality of virtual antenna ports of the antenna arrangement, said first transceiver circuitry being configured to:
      communicate with a second transceiver circuitry via the virtual antenna ports of said antenna arrangement,
      receive primary beamshaping information related to a first signal transmitted from said first transceiver circuitry to said second transceiver circuitry,
      determine secondary beamshaping information related to a second signal transmitted from said second transceiver circuitry to said first transceiver circuitry,
      apply at least one weight vector based on said primary and secondary beamshaping information for subsequent transmission of signals from said first transceiver circuitry via the plurality of virtual antenna ports of said antenna arrangement,
      measure signal parameters related to said second signal to determine said secondary beamshaping information based on statistics of the measured signal parameters, and
      calculate direction of departure (DOD) variances of said primary and secondary beamshaping information to select the weight vector based on the calculated DOD variances.

2. The apparatus according to claim 1, wherein the apparatus further is configured to apply the weight vector based on signal direction of transceiver circuitry other than said first and second transceiver circuitry.

3. The apparatus according to claim 1, wherein the apparatus further is configured to apply the weight vector based on movement of the second transceiver circuitry.

4. The apparatus according to, claim 1, wherein said secondary beamshaping information comprises: measured Direction on Arrival, estimated Direction on Departure and/or polarization state.

5. A method for wireless communication, said method comprising:
   transmitting, from a first transceiver circuitry to a second transceiver circuitry, a first signal via at least one virtual antenna port of an antenna arrangement to which the first transceiver circuitry is connected, wherein the virtual antenna port is a combination of one more physical antenna ports, and wherein the second transceiver circuitry is configured to determine primary beamshaping information related to the first signal and transmit the determined primary beamshaping information to the first transceiver circuitry, receiving, at the first transceiver circuitry, the transmitted primary beamshaping information, determining secondary beamshaping information at the first transceiver circuitry related to a second signal transmitted from said second transceiver circuitry to said first transceiver circuitry, applying at least one weight vector based on said primary and secondary beamshaping information for subsequent transmission of signals from said first transceiver circuitry via the antenna arrangement, measuring signal parameters over said second signal received at the first transceiver circuitry and determining the secondary beamshaping information based on statistics of the measured received signal parameters, and calculating direction if departure (DOD) variances of said primary and secondary beamshaping information, and the step of applying the weight vector comprises selecting the weigh vector based on calculated DOD variances.

6. The method according to claim 5, wherein the method further comprises applying the weight vector based on signal direction of transceiver circuitry other than said first and second transceiver circuitry.

7. The method according to claim 5, wherein the method further comprises applying the weight vector based on movement of the second transceiver circuitry.

8. The method according to claim 5, wherein selecting the secondary beamshaping information to comprise: measured Direction on Arrival, estimated Direction on Departure and/or polarization state.

9. A non-transitory computer-readable medium storing computer instructions for selecting weight vector in a wireless communication system, wherein said computer instructions are operative to cause a processor that executes the computer instructions to perform the method as defined in claim 5.

10. A node in a wireless communication system, said first node comprising a transceiver circuitry and an antenna arrangement, said transceiver circuitry being connected to a plurality of virtual antenna ports of the antenna arrangement, each virtual antenna port is a combination of one or more physical antenna ports, said node is configured to:

transmit a first signal to a second node in the wireless communication system, receive, from the second node, primary beamshaping information related to the first signal transmitted from the node to said second node, determine secondary beamshaping information related to a second signal transmitted from said second node to the node, apply at least one weight vector based on said primary and secondary beamshaping information for subsequent transmission of signals from said transceiver circuitry of the node via the plurality of virtual antenna ports of said antenna arrangement, measure signal parameters over said second signal to determine said secondary beamshaping information based on statistics of the measured signal parameters, and calculate direction of departure (DOD) variances of said primary and secondary beamshaping information to select the weight vector based on the calculated DOD variances.

11. The node according to claim 10, wherein the node further is configured to apply the weight vector based on signal direction of nodes other than said node and said second node in the communication system.

12. The node according to claim 10, wherein the node further is configured to apply the weight vector based on movement of the second node.

13. The node according to claim 10, wherein said secondary beamshaping information comprises: measured Direction on Arrival, estimated Direction on Departure and/or polarization state.

14. The node according to claim 10, wherein the node is a base station and the second node is user equipment.

* * * * *

UNITED STATES PATENT AND TRADEMARK OFFICE
CERTIFICATE OF CORRECTION

PATENT NO.        : 8,750,253 B2
APPLICATION NO.   : 13/139817
DATED             : June 10, 2014
INVENTOR(S)       : Petersson et al.

Page 1 of 1

It is certified that error appears in the above-identified patent and that said Letters Patent is hereby corrected as shown below:

In the Claims

Column 10, Line 57, Claim 4, delete "to," and insert -- to --, therefor.

Column 11, Line 20, Claim 5, delete "if" and insert -- of --, therefor.

Signed and Sealed this
Twenty-fifth Day of November, 2014

Michelle K. Lee
*Deputy Director of the United States Patent and Trademark Office*